US007913903B1

(12) United States Patent
Jones et al.

(10) Patent No.: US 7,913,903 B1
(45) Date of Patent: Mar. 29, 2011

(54) SYSTEM AND METHOD FOR GRANTING ACCESS TO A RESTRICTED ACCESS AREA USING AN APPROVED LIST

(75) Inventors: Richard Jones, Garnet Valley, PA (US); Michael V. Kutsch, Chadds Ford, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 745 days.

(21) Appl. No.: 11/942,211

(22) Filed: Nov. 19, 2007

(51) Int. Cl.
*G06K 5/00* (2006.01)

(52) U.S. Cl. .................................... 235/382; 235/382.5

(58) Field of Classification Search .................. 235/382, 235/382.5
See application file for complete search history.

(56) References Cited

U.S. PATENT DOCUMENTS

| | | | | |
|---|---|---|---|---|
| 3,438,489 | A | 4/1969 | Cambornac et al. | |
| 4,654,658 | A | 3/1987 | Walton | |
| 4,899,036 | A | 2/1990 | McCrindle et al. | |
| 5,053,774 | A | 10/1991 | Schuermann et al. | |
| 5,103,079 | A | 4/1992 | Barakai et al. | |
| 5,212,373 | A | 5/1993 | Fujioka et al. | |
| 5,286,955 | A | 2/1994 | Klosa | |
| 5,337,063 | A | 8/1994 | Takahira | |
| 5,449,894 | A | 9/1995 | Bruhnke et al. | |
| 5,479,172 | A | 12/1995 | Smith et al. | |
| 5,484,997 | A | 1/1996 | Haynes | |
| 5,504,321 | A | 4/1996 | Sheldon | |
| 5,569,903 | A | 10/1996 | Matsubara | |
| 5,828,044 | A | 10/1998 | Jun et al. | |
| 7,156,301 | B1 * | 1/2007 | Bonalle et al. | 235/380 |
| 2002/0066042 | A1 * | 5/2002 | Matsumoto et al. | 713/202 |
| 2008/0191009 | A1 * | 8/2008 | Gressel et al. | 235/382 |

FOREIGN PATENT DOCUMENTS

| | | |
|---|---|---|
| GB | 2267626 | 8/1993 |
| WO | WO 91/14237 | 9/1991 |
| WO | WO 94/22115 | 9/1994 |

OTHER PUBLICATIONS

San Francisco Chronicle, "Visa putting new life in advertising theme / 'It's Everywhere You Want to Be' ends after 20 years" Feb. 8, 2006 by George Raine.*

* cited by examiner

*Primary Examiner* — Daniel A Hess
(74) *Attorney, Agent, or Firm* — Hunton & Williams LLP

(57) ABSTRACT

A method for granting access to a restricted access area using an approved list is disclosed. According to one embodiment, the method may include the steps of (1) receiving a card number for the access card; (2) comparing the card number to an approved list of approved card numbers; (3) granting access to the area if the card number is on the approved list; (4) comparing the card number to a card presented list of presented card numbers; (5) adding the card to the card presented list and the approved list and granting access to the area if the card number is not on the approved list and the card number is not on the card presented list; and (6) denying access to the area if the card number is not on the approved list but is on the card presented list.

20 Claims, 6 Drawing Sheets

SYSTEM AND METHOD FOR GRANTING ACCESS TO A RESTRICTED ACCESS AREA USING AN APPROVED LIST

BACKGROUND OF THE INVENTION

1. Field of the Invention

The present invention generally relates to controlling access to an area, and, more particularly, to a system and method for granting access to a restricted access area using an access card and an approved list.

2. Description of the Related Art

Access cards can be used to control access to certain locations, such as a railway system, a bus, other transportation systems, a building, a secure area, etc. For example, U.S. Pat. No. 5,828,044, the disclosure of which is incorporated by reference in its entirety, discloses the use of a "non-contacting type radio frequency recognizing credit card" that may be used in an automated transit fare collection system. According to this patent, the user of the card presents the card to a card terminal that activates the card by transmitting radio waves to the card. The activated card then transmits its card number to the card terminal, which then transmits the card number to a terminal computer. The terminal computer compares the card number to a so-called "blacklist" of cards. If the card number is not on the blacklist, access is granted. If the card number is on the blacklist, access is denied.

SUMMARY OF THE INVENTION

A system and method for granting access to a restricted access area using an approved list are disclosed. According to one embodiment, the system may include a card reader that receives a card number from the access card; a card verifier comprising an approved list of card numbers; a card presented list of presented card numbers; and a processor that compares the card number to the approved list and compares the card number to the card presented list; and an access device. The access device grants access to the area if one of (1) the card number is on the approved list and (2) the card number is not on the presented list, and the access device denies access to the area if the card number is not on the approved list and the card number is on the presented list.

The card reader may be an optical card reader, a magnetic stripe reader, or it may receive the card number by radio frequency waves.

The system may also include a central controller that receives data regarding access card presentation. The central controller may clear transactions with access cards, and update the approved list and the card presented list.

The card verifier may also update the approved list and the card presented list.

A method for controlling access to an area using an access card is disclosed. According to one embodiment, the method may include the steps of (1) receiving a card number for the access card; (2) comparing the card number to an approved list of approved card numbers; (3) granting access to the area if the card number is on the approved list; (4) comparing the card number to a card presented list of presented card numbers; (5) adding the card to the card presented list and the approved list and granting access to the area if the card number is not on the approved list and the card number is not on the card presented list; and (6) denying access to the area if the card number is not on the approved list but is on the card presented list.

The card number may be received by optically reading the card number from the access card, by reading a magnetic stripe on the access card, or through radio frequency waves.

The method may also include the step of transmitting data regarding access card presentation to a central controller.

The method may also include the step of clearing transactions associated with the access cards.

The method may also include the steps of updating the approved list and updating the approved list.

According to another embodiment, a method for controlling access to a restricted area using an access card having a card number is disclosed. The method may include the steps of (1) receiving the card number for the access card at a point of entry for the restricted area; (2) comparing the card number to an approved list of card numbers; (3) if the card number is on the approved list: (a) removing the card number from the approved list; (b) granting access to the restricted area; (c) receiving the card number for the access card at a point of exit for the restricted area; and (d) adding the card number to the approved list; and (4) denying access to the restricted area if the card number is not on the approved list. The card number is received by at least one of optically reading the card number from the access card, by reading a magnetic stripe on the access card, and by receiving radio frequency waves.

According to another embodiment, a system for controlling access to a restricted area using an access card is disclosed. The system may include an access card having a card number; an entry point card reader located at an entry point to the restricted area that receives the card number from the access card; an exit point card reader located at an exit point to the restricted area that receives the card number from the access card; a card verifier; and an access device controls access to the restricted area. The card verifier may include a processor and a memory having an approved list of card numbers. The access device grants access to the restricted area if one of (1) the card number is on the approved list and (2) the card number is not on the presented list; and the access device denies access to the area if the card number is not on the approved list and the card number is on the presented list.

A transaction associated with the access card may be based on at least one of a time in the restricted area and a distance between the entry point and the exit point.

The system may further include a central controller that clears the transaction.

According to another embodiment, a system for controlling access to a restricted area using an access card is disclosed. The system may include an access card having a card number; a card reader that receives the card number from the access card; a card verifier; and an access device. The card verifier may include a processor; a memory having an approved list and a presented list; a program that determines whether the card number is included in at least one of the approved list and the presented list; and a central controller in communication with the card verifier. The access device grants access to the restricted area if one of (1) the card number is on the approved list and (2) the card number is not on the presented list; and the access device denies access to the area if the card number is not on the approved list and the card number is on the presented list.

It is a technical advantage that a system and method for granting access to a restricted access area using an approved list are disclosed. It is another technical advantage that a card reader may be an optical card reader, a magnetic stripe reader, or it may receive the card number by radio frequency waves. It is yet another technical advantage that an approved list of card numbers may be used to grant access to a restricted area. It is still another advantage that a card presented list of card numbers may also be used to grant access to the restricted area if the card number is not on the approved list.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
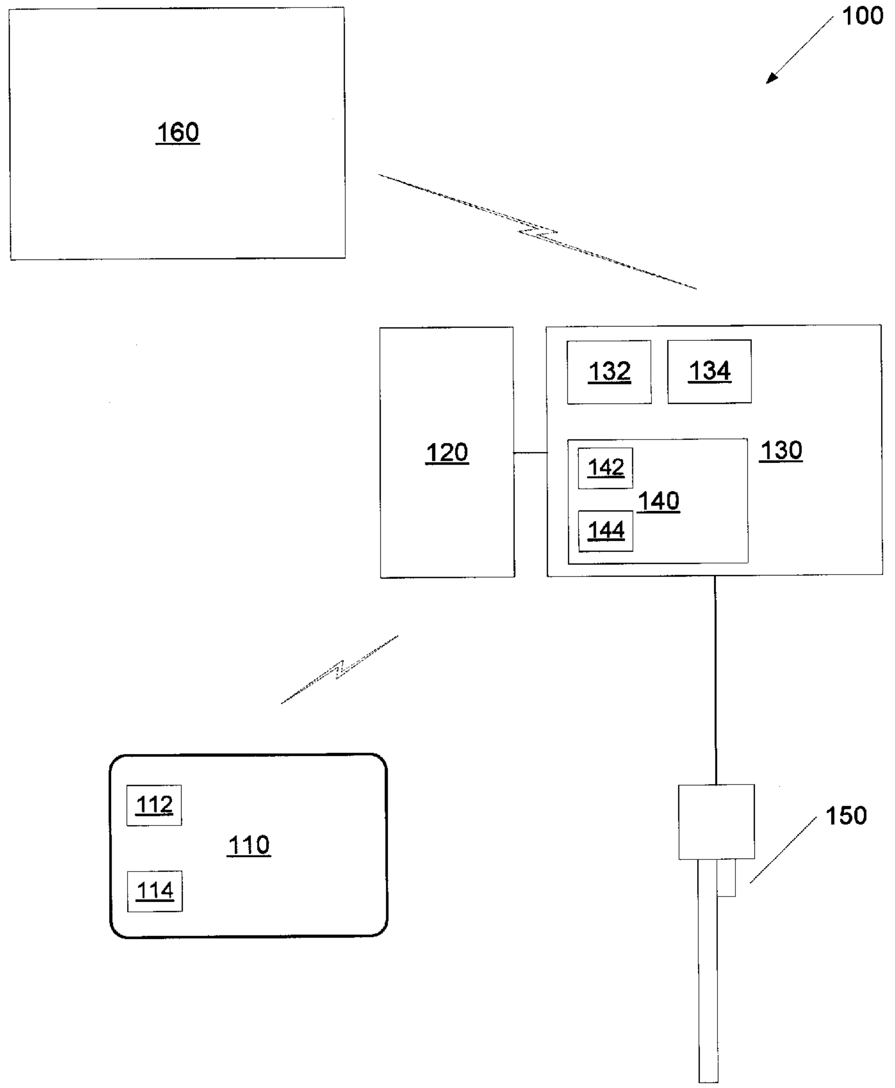
FIG. 1 is a block diagram of a system for granting access to a restricted access area using an approval list according to an embodiment of the present invention.

Several embodiments of the present invention and their advantages may be understood by referring to FIGS. 1-6, wherein like reference numerals refer to like elements.

Referring to FIG. 1, a system for granting access to a restricted access area, such as a transit system (e.g., a bus, rail or air system), a controlled-access highway (e.g., a tollway), the interior of a building (e.g., the secure area of airport, an office, a parking garage, etc.), a ticketed event (e.g., a concert, a sporting event, etc.), etc., using an approved list according to one embodiment of the present invention is disclosed. In this embodiment, system 100 includes access card 110, card reader 120, card verifier 130, access device 150, and central controller 160.

Access card 110 may be any type of device that is capable of carrying, storing, and/or transmitting card identification information, such as a card number. An access card may have the traditional credit card form-factor, or it may be larger or smaller, or it may be a key fob, token, PDA, cell phone, or any other RF-enabled device.

Although the phrase "card number" will be used herein, it should be recognized that this phrase encompasses letters, numbers, symbols, or any other card identification feature. In one embodiment, card identification information may be provided mechanically (e.g., by physically marking access card 110 with the card identification information). For example, access card 110 may include an optically-readable mark (e.g., a bar code) that is encoded with the card number.

In one embodiment, the card number does not have to be unique to a particular card. In another embodiment, the card number may be an alias.

In another embodiment, card identification information may be provided electronically (e.g., magnetically, stored in memory, etc.). For example, access card 110 may include a magnetic stripe that is encoded with the card number. As another example, access card 110 may include an integrated circuit 112 and memory 114 that stores the card number. Access card 110 may be self-powered, or it may rely on an external source to generate power. Examples of such access cards 110 are disclosed in U.S. Pat. No. 5,053,774; U.S. Pat. No. 5,103,079; U.S. Pat. No. 5,212,373; U.S. Pat. No. 5,337,063; U.S. Pat. No. 5,286,955; U.S. Pat. No. 5,449,894; U.S. Pat. No. 5,479,172; U.S. Pat. No. 5,484,997; U.S. Pat. No. 5,504,321; U.S. Pat. No. 5,569,903; U.S. Pat. No. 5,828,044; PCT Publication No. WO 91/14237; PCT Publication No. WO 94/22115; and UK Patent Application GB 2267626, the disclosures of which are incorporated, by reference, in their entireties.

Other mechanisms for providing access card 110 with the card number may be used as necessary and/or desired.

System 100 further includes card reader 120. Card reader 120 may be any device that is capable of reading or receiving the card number of access card 110. In one embodiment, card reader 120 may be an optical scanner. In another embodiment, card reader 120 may be a magnetic stripe reader. In still another embodiment, card reader 120 may use radio communication to receive the card number. For example, card reader 120 may radiate a radio wave that generates an induced electromotive force in access card 110, which then causes access card 110 to transmit its card number using radio waves. Alternatively, access card 110 may be "self-powered" (e.g., it may have a battery (not shown)) and not require energy from an outside source.

Examples of card readers that use radio waves are disclosed in, for example, U.S. Pat. No. 3,438,489; U.S. Pat. No. 4,654,658; U.S. Pat. No. 4,899,036; U.S. Pat. No. 5,053,774; U.S. Pat. No. 5,286,955; and U.S. Pat. No. 5,828,044, the disclosures of which are incorporated by reference in their entireties.

Card reader 120 may communicate with card verifier 130. Card reader 120 may include processor 132, programs 134, and memory 140. In one embodiment, card reader 120 may communicate with card verifier 130 by wires. In another embodiment, card reader 120 may communicate with card verifier wirelessly. Card verifier 130 receives data (e.g., card number) from card reader 120, and determines if access should be granted based on the card number read by card reader 120.

Card verifier 130 may be co-located with card reader 120. In another embodiment, card verifier 130 may be located remotely from card reader 120.

In one embodiment, processor 132 executes program 134 in order to determine if the holder of access card 110 should be granted access to the restricted access area. In one embodiment, program 134 compares access card 110's card number to approved list 142 of card numbers stored in memory 140. Presented card list 142 may be a database of card numbers. If access card 110's card number is on approved list 142, card verifier 130 may provide a control signal to access device 150 that cause access device 150 to grant access to the restricted access area.

If access card 110's card number is not on approved list 142, in one embodiment, access to the restricted access area is denied.

In one embodiment, approved list 142 may initially be pre-populated with active card numbers that are in good standing. In another embodiment, approved list 142 may have card numbers manually added or deleted.

Access to the restricted access area may still be granted even if access card 110's card number is not on approved list 142. Specifically, program 134 may compare 110's card number to presented card list 144 of card numbers. Presented card list 144 may be a database of card numbers. If access card 110's card number is not on presented card list 144, indicating that this is the first time that access card 110 is being presented, card verifier 130 may also provide a control signal to access device 150 that causes access device 150 to grant access to the restricted access area.

If program 134 determines that access card 110's card number is not on approved list 142, and that access card 110's card number has been presented before, card verifier 130 may not send a control signal to access device 150 to grant access to the restricted access area. In another embodiment, card verifier 130 may send a control signal to access device 150 to deny access to the restricted access area.

Card verifier 130 may also provide control signals to card reader so that a user may be provided feedback that the access card 110's card number has been read or not read, accepted or rejected, etc. Such feedback may be provided audibly (e.g., recorded voice, sounds, etc.) and/or visually (e.g., text messages, lights, etc.).

Access device 150 may be any suitable mechanical device that grants access to the restricted access area. Suitable types of access devices include, for example, a gate, a turnstile, a door, etc.

In one embodiment, card verifier 130 may communicate with a plurality of card readers 120 and a plurality of access devices 150.

In one embodiment, separate card verifiers 130 may be provided at an entry point and at an exit point of a restricted access area. For example, card verifier may be provided at an exit point of a transportation station (e.g., a train station) so that entry point and exit point data may be collected. In one embodiment, this data may be used to calculate a fare based on the distance traveled, time in transit system, time in a restricted access area, etc.

In one embodiment, a single card verifier 130 may perform the functions of an entry point card verifier and an exit point card verifier.

Card verifier 130 may communicate with central controller 160. In one embodiment, central controller 160 may be located remotely from card verifier 130.

Central controller 160 may also include network connections (not shown). For example, in one embodiment, central controller 160 may include direct and/or indirect connections to credit card and/or debit card networks to allow it to charge credit cards or debit accounts. Similarly, central controller 160 may include direct and/or indirect connections to the Internet.

Card verifier 130 may provide central controller 160 with data regarding card numbers that are presented during a period. For example, card verifier 130 may transmit data regarding card number, the time and date that card was presented, whether access was granted, location, and any other data that may be necessary and/or desired.

Central controller 160 may also periodically provide information to card verifier 130. For example, in one embodiment, central controller 160 may periodically transmit a replacement file for approved list 142 and/or card presented list 144. This may involve the transmission of a complete replacement file or an update to the existing file. In addition, central controller 160 may also provide updates to program 134 as necessary and/or desired.

Figure 2:
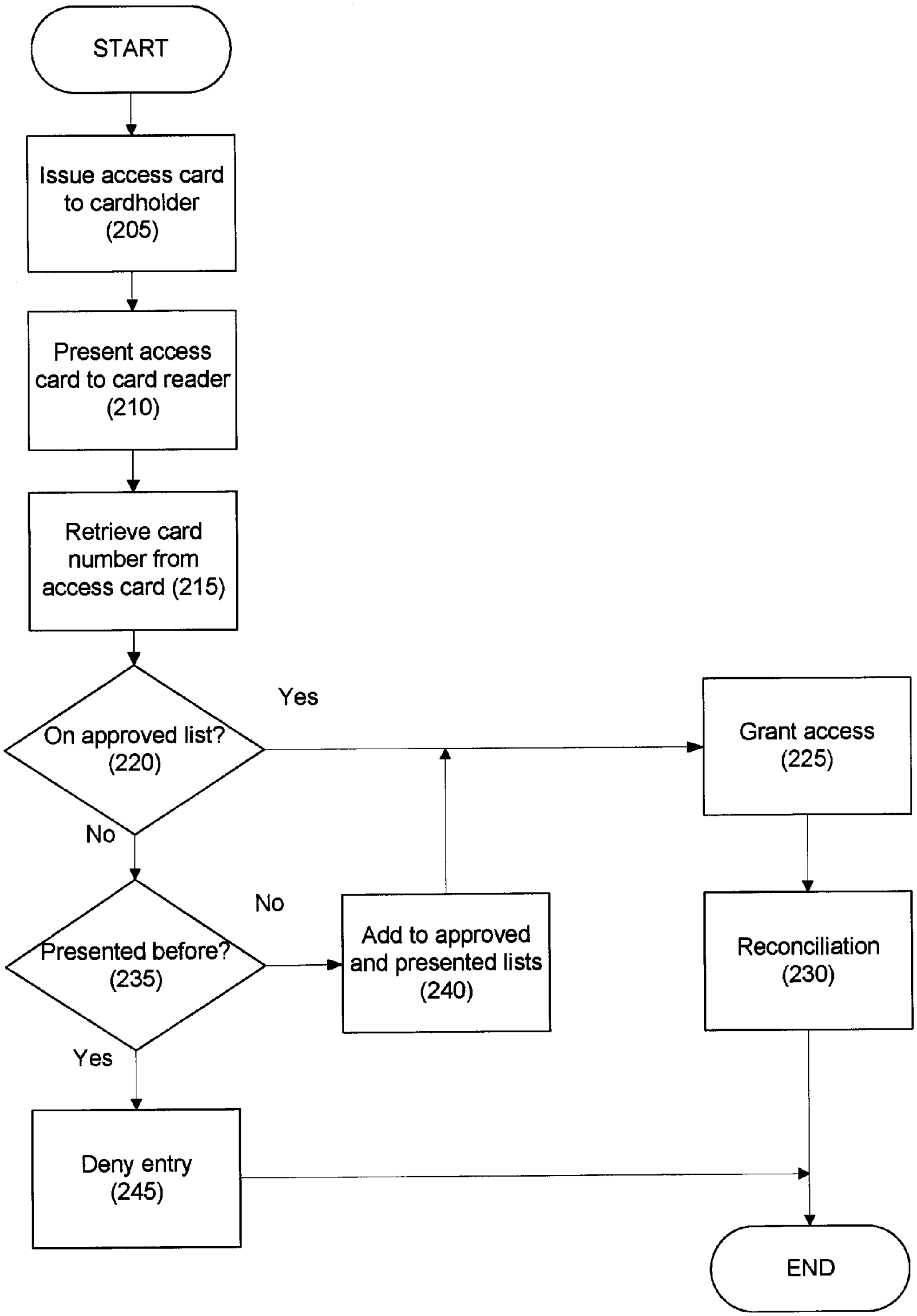
FIG. 2 is a flow chart of a method for granting access to a restricted access area using an approval list according to an embodiment of the present invention.

Referring to FIG. 2, a flowchart of a method according to one embodiment of the present invention is disclosed. In step 205, an access card is issued to a cardholder. This may involve, for example, receiving cardholder personal information (name, address, etc.), billing information (e.g., credit card or debit card information, checking account information, etc.) or any information that may be necessary to send an invoice, charge, and/or debit the cardholder for actual and/or anticipated card usage. In one embodiment, a separate account associated with the card may be created for the cardholder.

In one embodiment, after it is successfully issued to a cardholder, the card number may be added to the approved list.

In step 210, the cardholder presents his or her access card that includes a card number to a card reader. In step 215, the card reader receives the card number from the access card. In one embodiment, this may be achieved by the user swiping magnetic stripe of the access card. In another embodiment, the user may insert the access card into the card reader. In yet another embodiment, the user may have the access card optically scanned. In still another embodiment, the card reader may use radio frequency communication to energize an integrated circuit in the access card, and cause the access card to transmit its card number by radio frequency waves.

If the card number is successfully received, the cardholder may be so informed audibly or visually. If the card number was not successfully retrieved, the card holder may be informed audibly or visually, and requested to re-present his or her card to the card reader.

In step 220, the card number is compared to the card numbers on the approved list. If the card number is determined to be on the approved list, in step 225, the cardholder is granted access. This may involve opening a gate, allowing a turnstile to turn, opening a door, etc.

In one embodiment, a single access card may be used to provide multiple accesses. For example, a single access card may be used to admit a group of persons. This may be achieved by, for example, presenting the same card to the card reader prior to each access. Access may be granted provided that the card remains on the approved list for each presentation.

In step 230, the use of the card is reconciled. In one embodiment, this may be done with each use of the card. In another embodiment, this may be done periodically. Reconciliation will be discussed in greater detail with reference to FIG. 3, below.

If the card number is determined to not be on the approved list, in one embodiment, in step 235, the card number is compared to a list of cards that have been previously presented. If the card number is determined to having not been presented before, in step 240, in one embodiment, the card number may be added to the approved list and/or the card presented list, and the cardholder is granted access in step 225. In another embodiment, the card number may be marked for addition to the approved list and/or the card presented list during reconciliation.

If the card number is determined to having been presented before, in step 245, the cardholder is denied access.

In another embodiment, if, in step 220, the card number is not on the approved list, in step 245, entry is denied.

A method for reconciliation is provided. As discussed above, reconciliation may take place each time a card is used, or it may take place periodically. In addition, periodic reconciliation may be performed in batches. For example, data regarding all card numbers that were presented during the period in question may be reconciled at one time. As another example, reconciliation may occur after a certain number of cards are presented.

Figure 3:
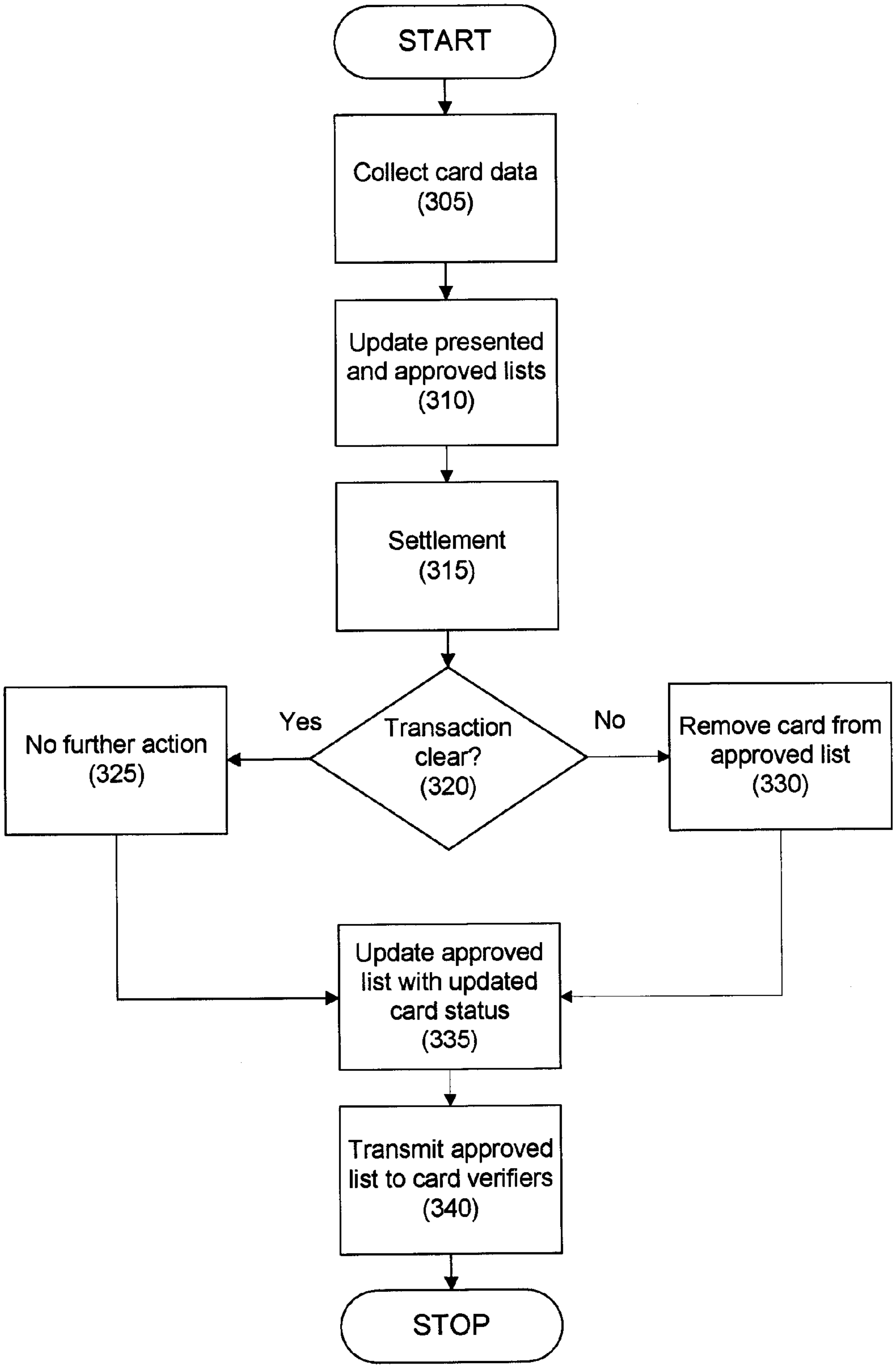
FIG. 3 is a flow chart of a method for reconciliation according to an embodiment of the present invention.

Referring to FIG. 3, in step 305, data regarding the cards that were presented to card readers is collected. As discussed above, this may be data regarding a single card presentation, or it may be data regarding the presentation of multiple cards during a specific period. In one embodiment, this data may be collected by a central controller, and it may be transmitted as necessary and/or desired. In one embodiment, the data is transmitted at the end of the business day.

In step 310, in one embodiment, the card presented list and/or the approved list are updated to include the card number.

In step 315, the card numbers collected in step 305 are settled. In one embodiment, this may involve debiting a cardholder's account the value of a trip, charging a cardholder's credit or debit card of record, drawing down a balance, debiting a checking account, generating an invoice, reducing authorized number of card-presentations, etc.

In one embodiment, access cards that are on the approved list, but are temporarily removed from that list (indicating, for example, that the card was presented at an entry point but not at an exit point) are added back to the approved list. A standard charge may be applied to these cards for prior to reconciliation.

In step 320, if the transaction for a card number is cleared (e.g., is processed successfully, the associated account has a positive value, etc.), then in step 325 no further action regarding the card number is necessary. The card number remains on both the approved list and the card presented list.

If, in step 320, a transaction for a card number does not clear (e.g., it does not process successfully, there are insufficient funds to cover the transaction, the associated account has a negative value, etc.), in step 330, the card is removed from the approved list.

In one embodiment, the card may be immediately removed from the approved list. In another embodiment, more than one attempt may be made to successfully clear a transaction before the card is removed from the approved list.

In one embodiment, even though the card may be removed from the approved list, attempts to successfully clear the transaction may continue.

In step 335, the approved list may be updated to reflect changes in the status of the cards. For example, cards that are reported lost or stolen may be removed from the approved list. In another embodiment, cards that have expired may also be removed from the approved list. For example, cards may be valid for a predetermined period, such as 1-hour, 24-hours, a weekend, etc. Following the expiration of this period, the cards may be removed from the approved list. As another example, cards may also be valid for a certain number of accesses to the restricted area. After the number of presentations is used, the card may be removed from the approved list.

In another embodiment, cards that were previously presented but not on the approved list may be added to the approved list. For example, a card may be added to the approved list if its account status is brought current, additional access time is added, additional accesses are added, etc.

The removal or addition to the approved list may be either manual or automatic.

In step 340, the updated approved list and card presented list may be transmitted to the card verifiers. As discussed above, this may involve sending complete replacement files, updates to the files, etc., to the card verifiers. The updated lists may be transmitted periodically (e.g., every few days, daily, several times a day, hourly, etc.), as new cards are issued, on demand, or in any other manner that is necessary and/or desired.

Figure 4:
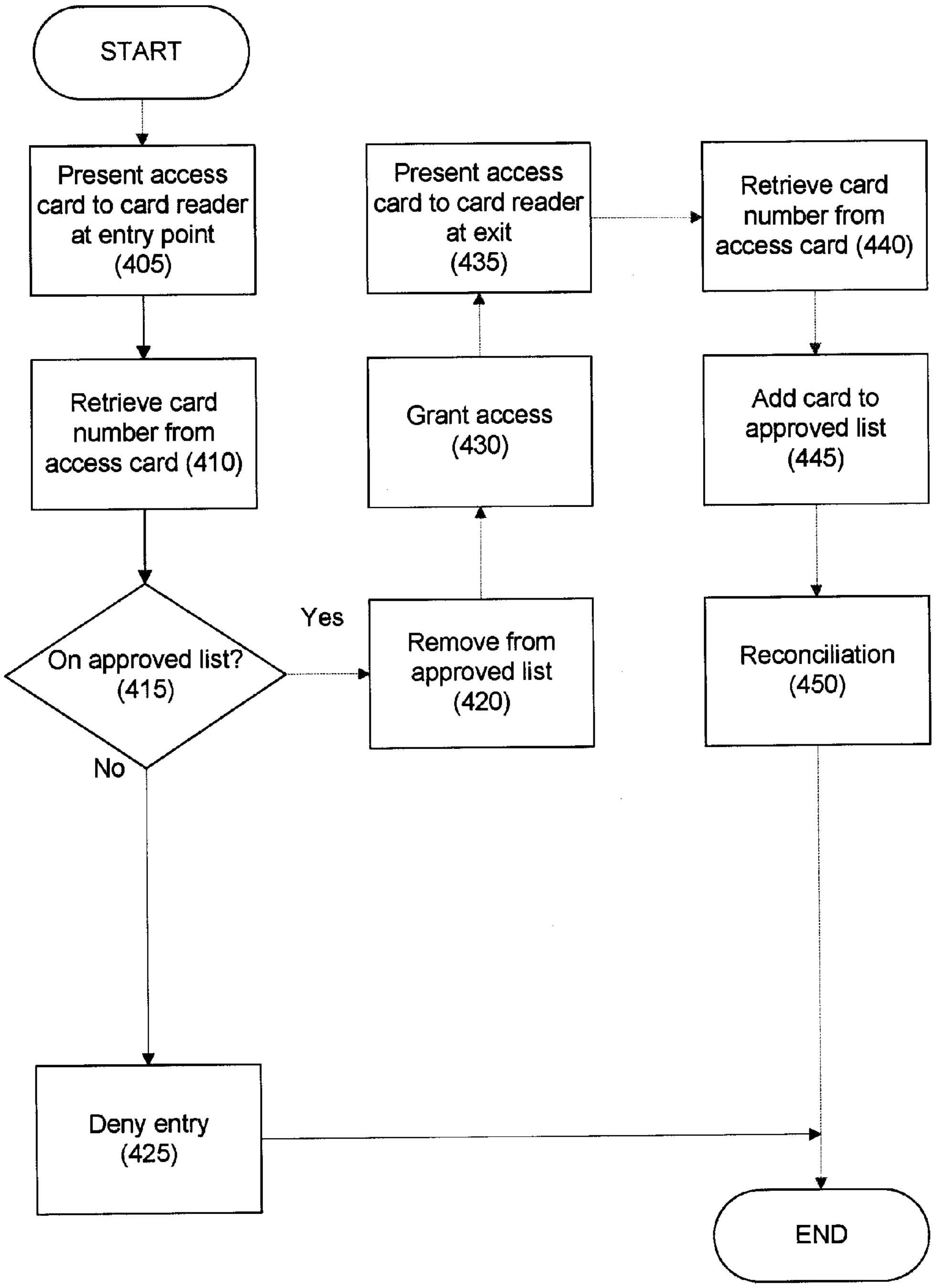
FIG. 4 is a flow chart of a method according to one embodiment of the present invention.

Referring to FIG. 4, an illustration of an embodiment of the invention is provided. In this embodiment, an access card may be used to provide in-and-out access privileges to a restricted area such as, for example, a parking garage, a concert, a sporting event, etc. In step 405, the card is presented to an access card reader at an entry point, and, in step 410, the card number is retrieved from the access card. These steps may be performed in a manner similar to that discussed with regard to steps 210 and 215, respectively.

In step 415, the card number is compared to the approved list. If, in step 415, the card is on the approved list, in step 420, the card may be removed from the approved list. This removal may be performed so that the card cannot be used to grant access again until it is presented for exit (discussed below).

If the card is not on the approved list, in step 425, entry is denied.

In step 430, access to the restricted area is granted. This may be performed similar to the manner in which step 225 is performed.

As discussed above, in one embodiment, a single access card may be used to authorize multiple entries.

In step 435, the card may be presented to an access device at an exit and, in step 440, the card number is retrieved from the card. These steps may be performed to the manner in which steps 405 and 410 are performed, respectively.

In one embodiment, the access device that is used to retrieve the card number at the point of exit area may be the same as the access device that is provided at the point of entry. In another embodiment, separate access devices may be provided at the point of entry and exit.

In step 445, the card is added to the approved list. This permits the card to be used again to enter the restricted area, if permitted.

In one embodiment, cards may be added back to the approved list after a predetermined amount of time after they are removed even if they are not presented at an exit. For example, a card may be used at an entry point, but not read at an exit point. This may occur if there is a card read error at the exit point, a power failure, or if the card is not presented at the exit point (e.g., the cardholder walked through an open gate). By adding the card back to the approved list, the card may be used again.

In one embodiment, the card may be added during clearing, or it may be added at the beginning of the next business day.

In step 450, transactions for the card may be reconciled, as discussed with regard to step 230.

Figure 5:
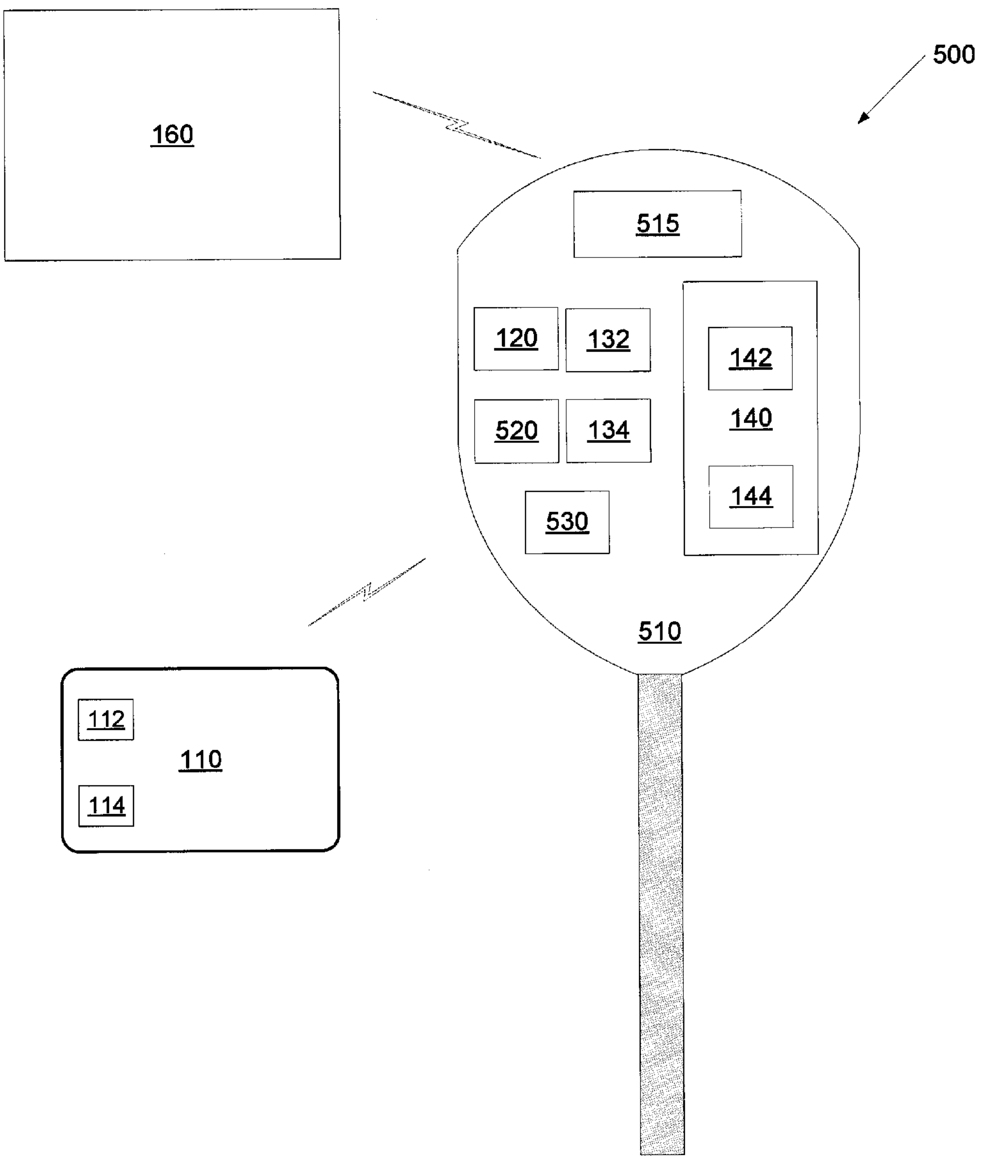
FIG. 5 is an illustration of an embodiment of the present invention in the context of a parking device.

Referring to FIG. 5, an illustration of an embodiment of the present invention in the context of a parking device is provided. System 500 includes parking device 510 and access card 110. Parking device 510 may be provided with card reader 120, processor 132, program 134, and memory 140. Memory 140 may include approved list 142 and presented list 144.

Parking device 510 may further include display 515, sensor 520, and interface 530. Display 515 may be used to communicate the status of card 110 to the user. For example, display 515 may indicate whether card 110 was accepted, rejected, the amount of time remaining, etc.

Sensor 520 may be used to determine whether a vehicle (not shown) is parked at a designated space (e.g., a parking space) for parking device 510. In one embodiment, sensor 520 may be, for example, a weight sensor that is located under the designated space. In another embodiment, sensor 520 may be, for example, a sensor that senses the presence of an object, such as a radio wave sensor (e.g., microwave, ultrasound, infrared, etc.).

Figure 6:
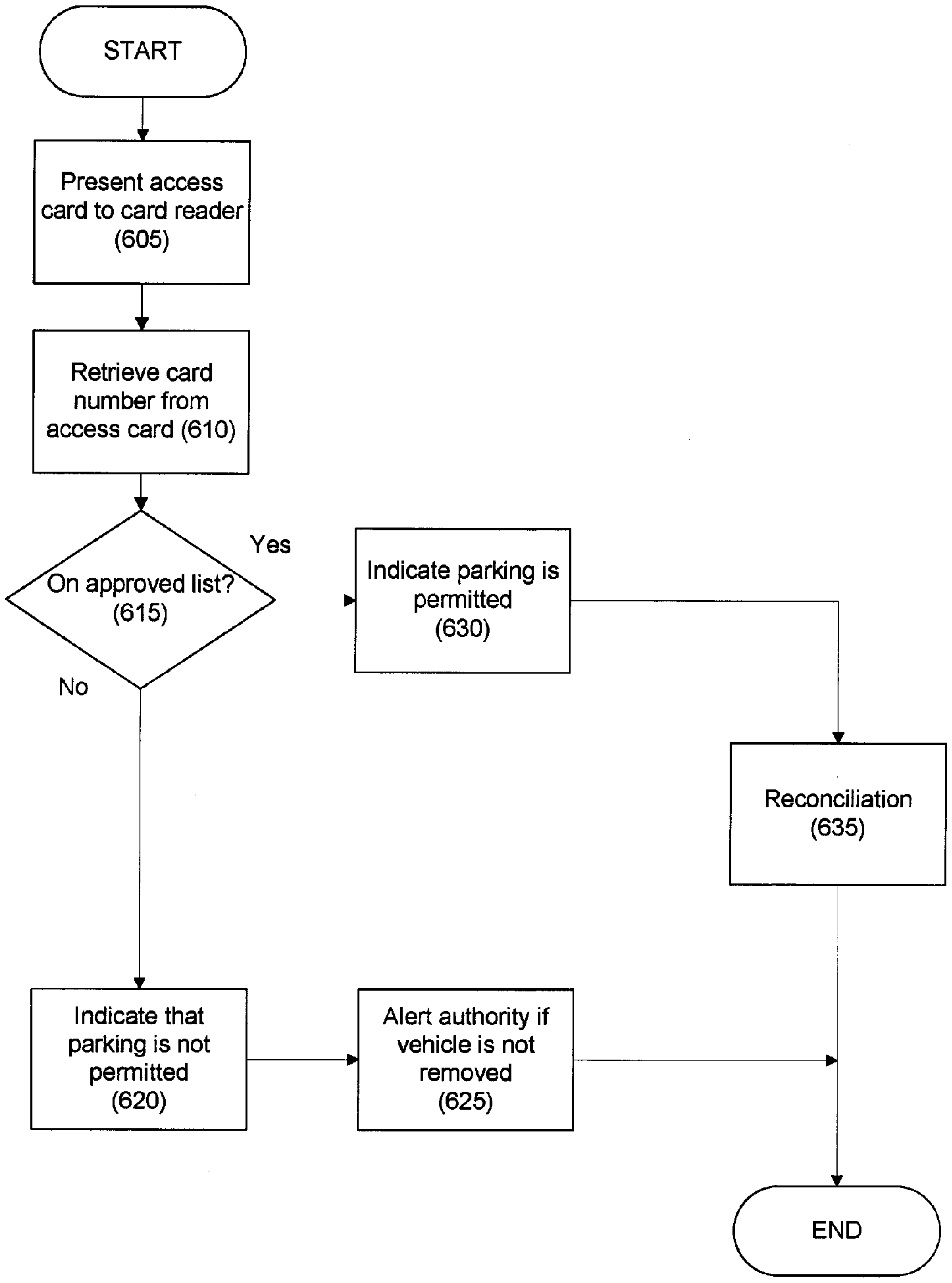
FIG. 6 is a flow chart of a method according to an embodiment of the present invention.

Referring to FIG. 6, a method for granting access using a system such as, for example, system 500, is provided. In step 605, the card is presented to an access card reader at an entry point, and, in step 610, the card number is retrieved from the access card. These steps may be performed in a manner similar to that discussed with regard to steps 210 and 215, respectively.

In step 615, the card number is compared to the approved list. If, in step 615, the card is on the approved list, in step 630, the user is informed that parking is permitted. In one embodiment, this may be conveyed visually and/or audibly.

In step 635, transactions for the card may be reconciled, as discussed with regard to step 230.

If, in step 615, the card is not on the approved list, in step 620, the user is informed that parking is not permitted.

In one embodiment, if the sensor determines that a vehicle is present and parking is unauthorized, in step 625, the authorities may be alerted. In one embodiment, this may involve informing a management company, a towing company, parking enforcement, etc.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions, memory card, SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for controlling access to a restricted area using an access card having a card number, comprising:

receiving the card number for the access card at a point of entry for the restricted area;

comparing the card number to an approved list of card numbers;

if the card number is on the approved list:

removing the card number from the approved list;

granting access to the restricted area;

receiving the card number for the access card at a point of exit for the restricted area; and adding the card number to the approved list; and denying access to the restricted area if the card number is not on the approved list.

2. The method of claim 1, wherein the card number is received by at least one of optically reading the card number from the access card, by reading a magnetic stripe on the access card, and by receiving radio frequency waves.

3. The method of claim 1, wherein the card number is received by optically reading the card number from the access card.

4. The method of claim 1, wherein the card number is received by reading a magnetic stripe on the access card.

5. The method of claim 1, wherein the card number is received by receiving radio frequency waves.

6. The method of claim 1, wherein the access card is a credit card.

7. The method of claim 1, wherein the access card is a key fob.

8. The method of claim 1, further comprising:

transmitting data regarding access card presentation to a central controller.

9. The method of claim 8, further comprising:

clearing transactions associated with the access cards.

10. The method of claim 1, further comprising:

updating the approved list.

11. The method of claim 1, further comprising:

pre-populating the approved list with active card numbers that are in good standing.

12. A method for controlling access to a restricted area using an access card having a card number, comprising:

receiving the card number for the access card at a point of entry for the restricted area;

comparing the card number to an approved list of card numbers;

if the card number is on the approved list:

removing the card number from the approved list;

granting access to the restricted area;

settling a transaction associated with the granted access;

receiving the card number for the access card at a point of exit for the restricted area;

adding the card number to the approved list; and denying access to the restricted area if the card number is not on the approved list.

13. The method of claim 12, wherein the step of settling a transaction associated with the granted access comprises debiting an account associated with the access card an amount for the granted access.

14. The method of claim 12, wherein the step of settling a transaction associated with the granted access comprises charging a credit account associated with the access card an amount for the granted access.

15. The method of claim 12, wherein the card number is received by optically reading the card number from the access card.

16. The method of claim 12, wherein the card number is received by reading a magnetic stripe on the access card.

17. The method of claim 12, wherein the card number is received by receiving radio frequency waves.

18. The method of claim 12, wherein the access card is a credit card.

19. The method of claim 12, wherein the access card is a key fob.

20. The method of claim 12, wherein the step of settling a transaction associated with the granted access comprises reducing a number of authorized card presentations associated with the access card.

* * * * *